US007723962B2

(12) United States Patent
Parkes, Jr. et al.

(10) Patent No.: US 7,723,962 B2

(45) Date of Patent: May 25, 2010

(54) HIGH VOLTAGE PROTECTION FOR A THIN OXIDE CMOS DEVICE

(75) Inventors: John J. Parkes, Jr., Boynton Beach, FL (US); Kai Zhong, Lake Worth, FL (US)

(73) Assignee: Freescale Semiconductor, Inc., Austin, TX (US)

(*) Notice: Subject to any disclaimer, the term of this patent is extended or adjusted under 35 U.S.C. 154(b) by 498 days.

(21) Appl. No.: 11/690,569

(22) Filed: Mar. 23, 2007

(65) Prior Publication Data

US 2008/0231240 A1 Sep. 25, 2008

(51) Int. Cl.
*H02P 11/00* (2006.01)
*H02P 9/00* (2006.01)

(52) U.S. Cl. .......................................................... 322/28

(58) Field of Classification Search ................... 322/28, 322/24, 44, 59; 323/284, 274; 320/123, 320/137; 361/21
See application file for complete search history.

(56) References Cited

U.S. PATENT DOCUMENTS

| | | | | |
|---|---|---|---|---|
| 4,560,918 | A * | 12/1985 | Callen | 323/273 |
| 5,604,653 | A * | 2/1997 | Pezzani et al. | 361/20 |
| 6,388,433 | B2 | 5/2002 | Marty | |
| 6,392,488 | B1 | 5/2002 | Dupuis et al. | |
| 7,015,677 | B2 | 3/2006 | Kawabata | |
| 7,372,174 | B2 * | 5/2008 | Jones et al. | 290/44 |
| 2006/0215342 | A1 * | 9/2006 | Montoya et al. | 361/103 |
| 2008/0231243 | A1 * | 9/2008 | Zhong et al. | 323/273 |
| 2009/0237045 | A1 * | 9/2009 | Dishman et al. | 323/271 |

* cited by examiner

*Primary Examiner*—Julio Gonzalez

(57) ABSTRACT

A circuit includes a voltage regulator (208) for outputting a voltage at a regulated level, a protection circuit (260), and a load circuit (210) coupled to the voltage regulator. The protection circuit includes means for preventing the voltage regulator from outputting a voltage at a level higher than the regulated level during a start-up period of the voltage regulator.

10 Claims, 3 Drawing Sheets

-PRIOR ART-

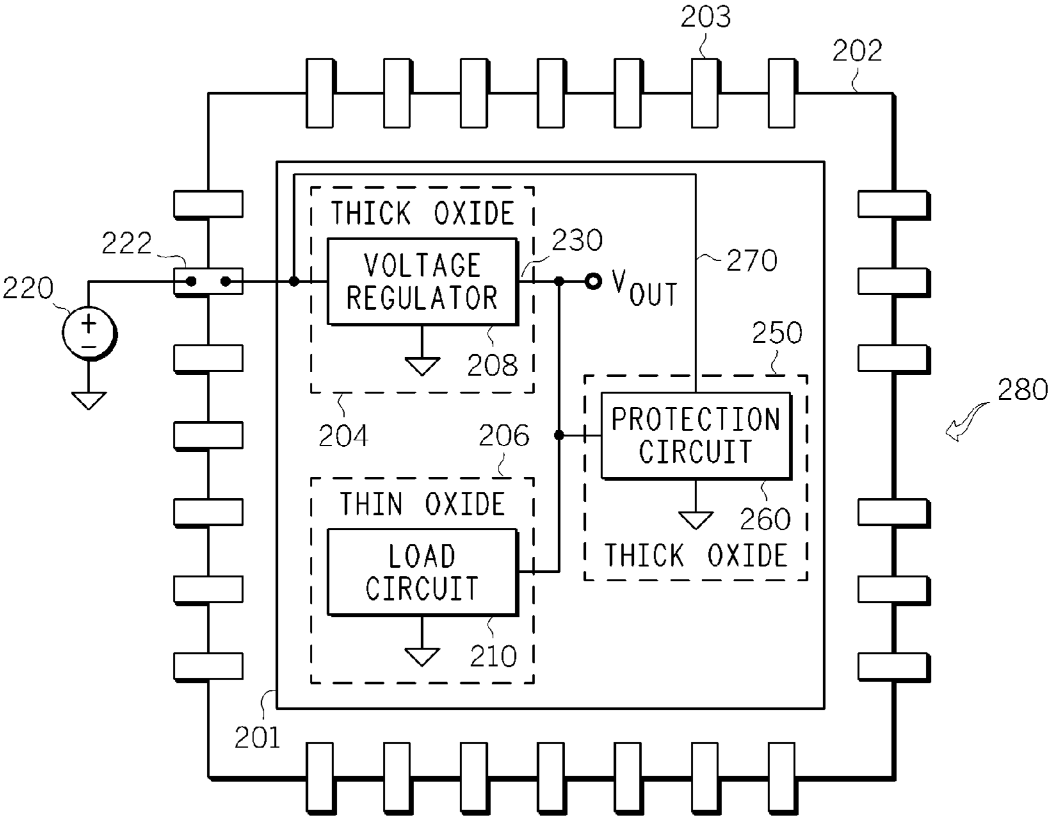
*FIG. 2*
200
*FIG. 3*
300
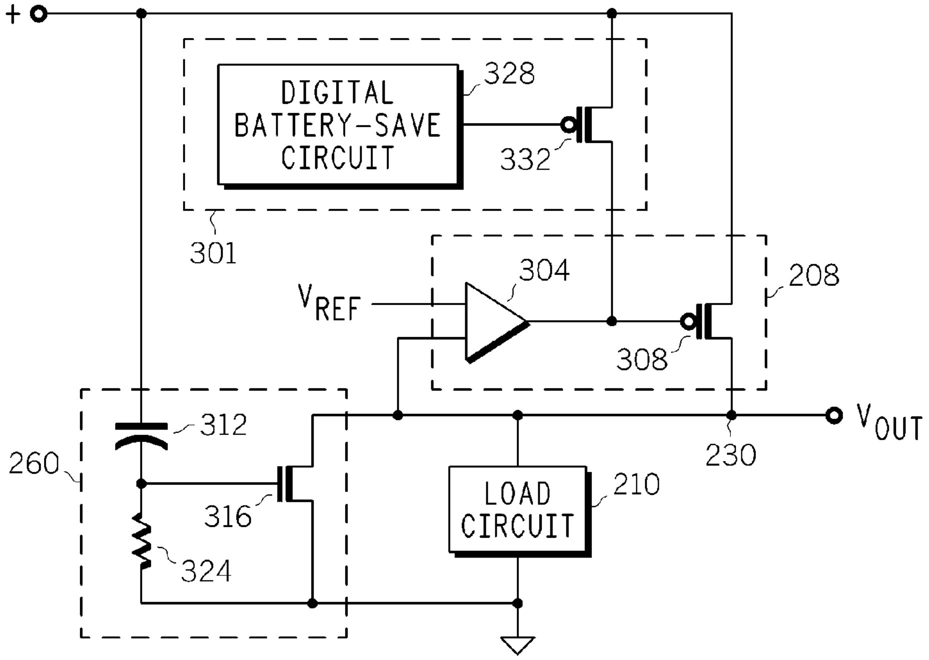

HIGH VOLTAGE PROTECTION FOR A THIN OXIDE CMOS DEVICE

BACKGROUND OF THE INVENTION

1. Field of the Invention

This invention relates generally to voltage regulators, and more specifically to voltage regulators in an integrated circuit used for supplying voltage to load circuits in the integrated circuit.

2. Related Art

In an integrated circuit (IC) fabricated using a dual-oxide, complementary metal oxide semiconductor (CMOS) process, there is at least one circuit whose components are built with thick oxide devices and at least one circuit whose components are built with thin oxide devices. The thin oxide devices consume less power than do the thick oxide devices; however, the thin oxide devices cannot withstand as high of a voltage without damage as can the thick oxide devices. An IC typically includes at least one voltage regulator. The regulator is built with thick oxide devices because the regulator is biased off the highest voltage available, which is typically the voltage of a battery that supplies power to the IC. The voltage of the battery is typically 1.7 v to 3.6 v, depending on the process used for fabricating the IC. The regulator provides a lower voltage power supply to circuits that are constructed with thin oxide devices, and a higher voltage power supply to circuits that are constructed with thick oxide devices. Depending on the process for manufacturing the IC, the regulated level of the voltage at the output of the regulator is typically 0.9 v to 1.6 v for thin oxide devices. Any occasion that the voltage at the output of the regulator goes above the regulated level, the thin oxide devices of the IC are at risk of being damaged, possibly leading to a circuit failure. The output of the regulator going above the regulated level is more likely to occur during connection of the battery to the IC ("battery insertion"), which is when the voltage supply increases abruptly from zero volts.

FIG. 1 illustrates a known circuit 100 that includes an IC 101 within an IC package 102. The IC package 102 has a plurality of pins 103 for connecting the IC 101 to circuits external to the IC package 102. The IC 101 includes a thick oxide portion 104 and a thin oxide portion 106. A regulator 108, which comprises a plurality of thick oxide devices, resides on the thick oxide portion 104, and a load circuit 110, which comprises a plurality of thin oxide devices, resides on the thin oxide portion 106. A battery 120 supplies power to the regulator 108 via a power-in pin 122. An output 130 from the regulator 108 is coupled to the load circuit 110 and provides a regulated voltage to the load circuit. The output 130 from the regulator 108 is also coupled to a power-out pin 132. An external capacitor 140 is coupled to the power-out pin 132 and to ground.

One known regulator 108 comprises an operational amplifier (not shown) and an analog drive device (not shown). Through a feedback loop, the operational amplifier maintains the voltage at the output 130 of the regulator 108 at the regulated level. At time of insertion of the battery 120, the analog drive device becomes active prior to the operation of the operational amplifier becomes established. As a result, the voltage of the output 130 of the regulator 108 can momentarily reach the voltage level of the battery 120, i.e., the output of the regulator overshoots the regulated voltage. The higher voltage level of the battery 120, while not high enough to damage circuits made from thick oxide devices, can damage circuits made from thin oxide devices.

Some ICs have a battery-save circuit. A battery-save circuit may be useful, during normal start-up to help prevent the voltage of the output of the regulator from going above the regulated level. This is because, during normal start-up, the digital circuitry that controls the battery-save analog transistor is always on because such digital circuitry does not turn-off during a normal turn-off procedure. However, such digital circuitry does turn-off as a result of removal of the battery, and, therefore, is not operating immediately prior to battery insertion. The battery-save circuit does not turn on fast enough to be effective at time of battery insertion. A typical battery-save circuit comprises digital circuitry whose output is coupled to a gate of an analog battery-save transistor. The analog drive device of the regulator turns on before the battery-save circuit turns on. Therefore, during battery insertion, the battery-save circuit cannot be relied upon to prevent the voltage of the output of the regulator to go above the regulated level.

If the load circuit 110 of the regulator 108 has a significant amount of capacitance, such as capacitor 140, the capacitance of the load can help absorb any voltage overshoot at the output 130 of the regulator that may occur immediately after battery insertion. Some ICs 101 save die area by not having a significant internal capacitance. If the load circuit 110 of the regulator 108 lacks a significant amount of capacitance, an excessive voltage overshoot during battery insertion is more likely to occur. When the load circuit 110 lacks sufficient capacitance to absorb a voltage overshoot, most known IC packages 102 use a power-out pin 132 for allowing a capacitor 140 external to the IC package to be coupled to the output 130 of the regulator 108.

Some IC packages save pin-out by not having the power-out pin. The outputs of regulators in such IC packages are more susceptible to voltage overshoots during battery insertion because such IC packages do not have any provision for allowing additional, external capacitance to be coupled to the output of such regulators.

Known protection circuits for ICs only address voltage overshoots that occur during normal start-up, that is, when the battery has remained continuously connected to the device during the period that the device was turned off.

Known protection circuits for ICs do not address protection from voltage overshoots that occur immediately after battery insertion. Known protection circuits for ICs do not address protection from voltage overshoots caused by the insertion of the battery 120.

Known protection circuits for ICs do not sense the supply voltage, such as the voltage of the battery 120, to limit the voltage of the output 130 of the regulator 108 to the regulated level.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a simplified diagram of an integrated circuit package, including a regulator, a load circuit and a protection circuit within the integrated circuit package, and a battery external to the integrated circuit package;

FIG. 3 is a simplified schematic of circuits within the integrated circuit package of FIG. 2, including schematics of the regulator and the protection circuit.

DETAILED DESCRIPTION OF THE EXEMPLARY EMBODIMENT

Figure 1:
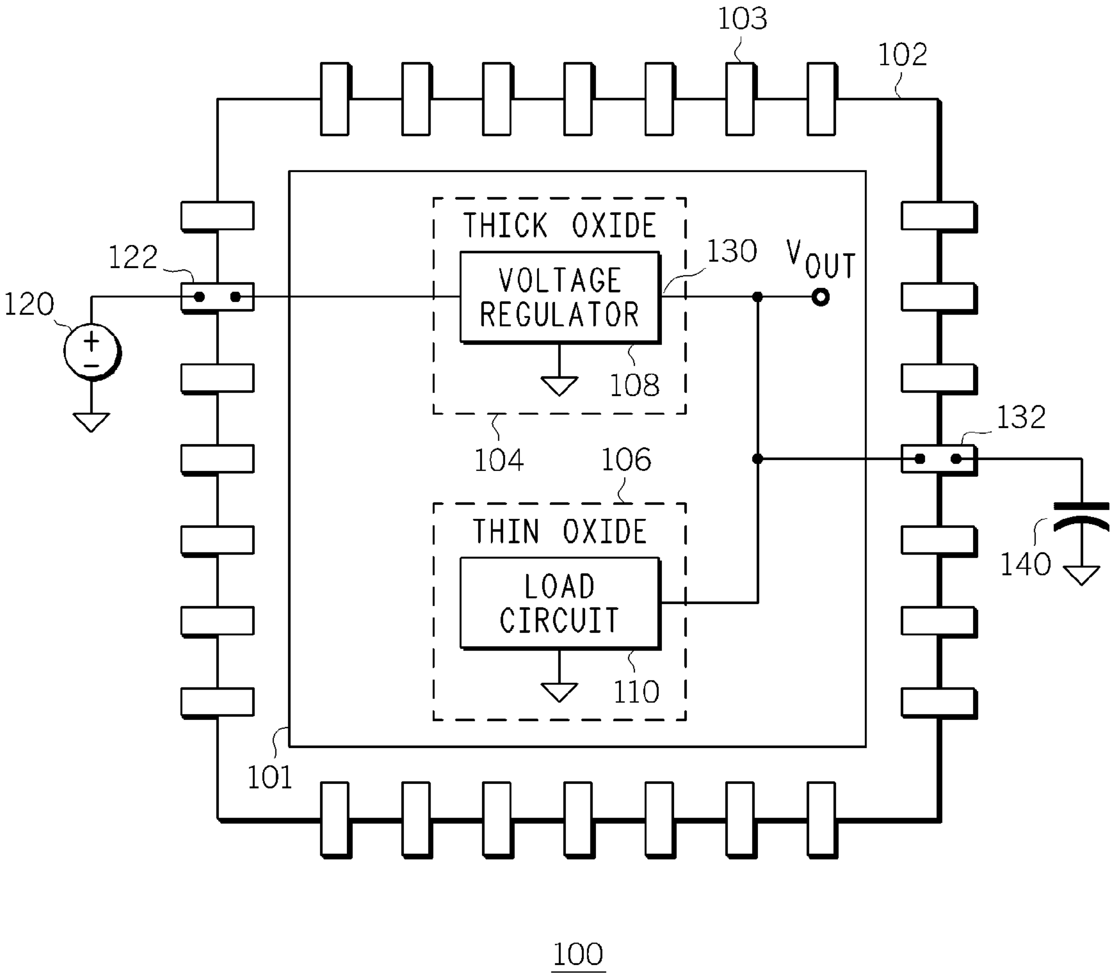
FIG. 1 is a simplified diagram of a prior art integrated circuit package, and a battery and a capacitor external to the prior art integrated circuit package.

FIG. 2 illustrates a circuit 200 that includes an integrated circuit (IC) 201 within an IC package 202. The IC 201 is fabricated using a dual-oxide, complementary metal oxide semiconductor (CMOS) process. The IC package 202 has a plurality of pins 203 for connecting the IC 201 to circuits external to the IC package 202. The IC 201 includes a thick oxide portion 204 and a thin oxide portion 206. A regulator 208, which comprises a plurality of thick oxide devices, resides on the thick oxide portion 204. A load circuit 210, which comprises a plurality of thin oxide devices, resides on the thin oxide portion 206. A battery 220 supplies power to the regulator 208 via a power-in pin 222. The regulator 208 provides a lower voltage to circuits on the thin oxide portion 206, and the regulator provides a higher voltage to other circuits (not shown) on the thick oxide portion 204. A typical circuit, such as the load circuit 210, on the thin oxide portion 206 is a digital circuit. In the exemplary embodiment, the regulator 208 provides a voltage 0.9 v to 1.6 v to circuits on the thin oxide portion 206. A typical circuit on the thick oxide portion 204 is an analog circuit. In the exemplary embodiment, the regulator 208 provides a voltage 2.4 v to 3.6 v to circuits on the thick oxide portion 204. In the exemplary embodiment, the IC 201 is fabricated using a 90-nm CMOS process, the thin oxide devices have a size of 21 Å, and the thick oxide devices have a size of 50 Å or 65 Å. An output 230 from the regulator 208 is coupled to the load circuit 210 and provides a regulated voltage to the load circuit. In the exemplary embodiment, the regulated voltage is less than the voltage of the battery 220. Depending on the process used to fabricate the IC 201, the voltage of the battery 220 is typically 1.7 v to 3.6 v. In the exemplary embodiment, the voltage of the battery 220 is 3 v. A protection circuit 260 is coupled to the output 230 of the regulator 208 and to the battery 220.

FIG. 3 is a simplified schematic 300 of circuits within the IC 201. The circuits within the IC 201 include a battery-save circuit 301, the regulator 208, the protection circuit 260 and the load circuit 210. The battery-save circuit 301 comprises a digital battery-save circuit 328 and a transistor 332. The regulator 208 comprises a differential amplifier 304 and a power transistor 308. Upon battery insertion, the power transistor 308 turns on before the differential amplifier 304 turns on because of the greater complexity of the differential amplifier. Furthermore, upon battery insertion, the power transistor 308 turns on before the battery-save circuit 301 turns on because of the uncertain state of the digital battery-save circuit 328. The regulator 208 needs a start-up period after first receiving electrical power from the supply (battery 220) to accurately maintain the voltage at the output 230 of the regulator at a regulated level. In the exemplary embodiment, the start-up period of the regulator 208 after battery insertion can be as long as 1 msec. Therefore, without the protection circuit 260, upon battery insertion, $V_{OUT}$ would try to follow the battery voltage. Without the protection circuit, a voltage overshoot would likely occur approximately 1 μsec after battery insertion. The digital battery-save circuit 301 that is used to strobe the regulator 208 during normal operation, cannot be used immediately after battery insertion because the digital battery-save circuit 328 is in an unknown state immediately prior to battery insertion. The circuit of the voltage regulator 208 and the protection circuit 260 form a voltage regulator unit.

The protection circuit 260 is coupled to the output 230 of the voltage regulator 208. The protection circuit 260 comprises capacitor 312, resistor 324, and transistor 316. The protection circuit 260 works as follows. Before battery insertion, the supply voltage and the output 230 of the regulator 208 are at 0 v, and the time constant of the protection circuit 260 is zero because the capacitor 312 is discharged. Upon battery insertion, capacitor 312 starts in a discharged state, i.e., capacitor 312 has 0 v across it. When the battery 220 is inserted, the supply voltage ramps up to 3 v, the capacitor 312 becomes charged within a few nanoseconds, which causes the gate of transistor 316 to be pulled high, thus pulling down the voltage of the output 230 of the regulator 208. With the gate of transistor 316 at 3 v, the drain of transistor 316 pulls the voltage of the output of the regulator 208 low, thereby preventing the voltage from going above the regulated level. In the exemplary embodiment, the regulated level is 1.2 v. The capacitor 312 discharges to ground through resistor 324. Once the capacitor 312 is discharged, the gate of transistor 316 is pulled low and the regulator 208 is free to operate normally. Transistor 316 remains off during normal operation and has no impact on the performance of the regulator 208. The protection circuit 260 is completely autonomous, and limits the voltage level of the output 230 of the regulator 208 during battery insertion, thereby protecting the CMOS devices in the load circuit 210 from breaking down. The protection circuit 260 senses the supply voltage, such as the voltage of the battery 220, to limit the voltage of the output 130 of the regulator 208 to the regulated level. The protection circuit 260 senses when the regulator 208 first powers up and limits the output 230 of the regulator for a duration based on a time constant. The time constant is determined by the values of capacitor 312 and resistor 324. In the exemplary embodiment, the value of the time constant is approximately 10 μsec. Therefore, in the exemplary embodiment, transistor 316 remains on for 30-50 μsec after battery insertion. Consequently, the protection circuit 260 protects the load circuit 210 during the period that a voltage overshoot is most likely to occur.

Figure 4:
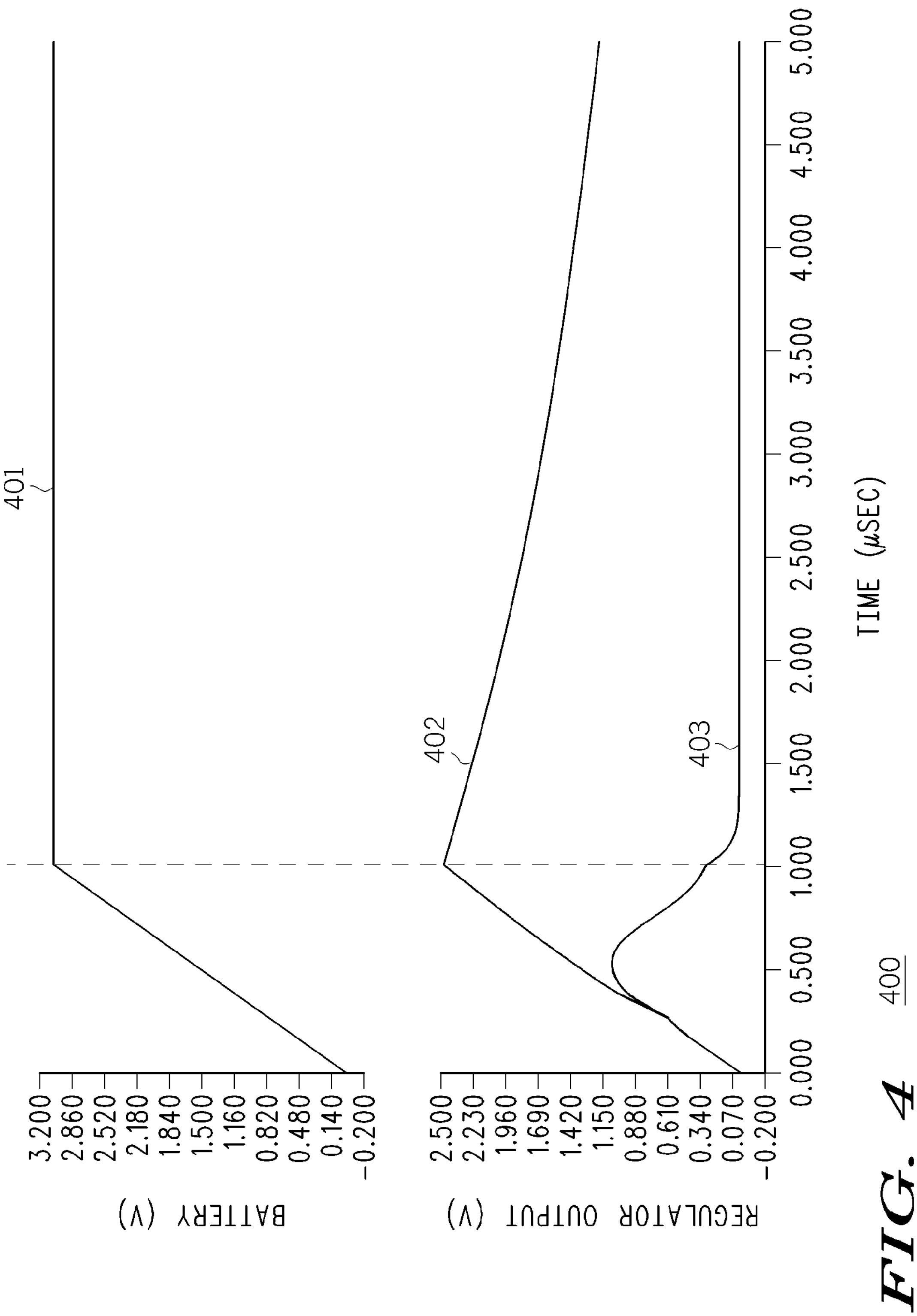
FIG. 4 is a chart of voltage of the battery and voltage at an output of the regulator, versus time, immediately after connection of the battery to the integrated circuit package.

FIG. 4 is a chart of voltage of the battery 220 and voltage at an output 230 of the regulator 208, versus time, immediately after connection of the battery 220 to the IC package 202. Curve 401 shows the 3 v supply ramping up. Curve 402 shows that, without the protection circuit 260, as the 3 v supply ramps up, the voltage at the output 230 of the regulator 208 starts to increase as well. If left unchecked, the voltage will increase well beyond the limits of thin oxide devices, and the voltage will approach the supply rail. Curve 403 shows that, with the protection circuit 260 in place, the voltage at the output 230 of the regulator 208 is limited to approximately 1 v during battery insertion. The voltages shown by curves 402 and 403 slowly reduce as load 210 bleeds off the output current to ground. Curves 402 and 403 represent the voltage at the output 230 of the regulator 208 with the regulator off, which is substantially the situation at battery insertion.

Advantageously, an IC 201 with the protection circuit 260 prevents the regulator 208 from violating voltage limitations placed on thin oxide CMOS devices in the IC. The protection circuit 260 protects thin oxide, lower-voltage CMOS devices, such as used with digital circuits, from damage by limiting, during battery insertion, voltage transients on the output 230 of the regulator 208.

The protection circuit 260 is not limited for use with the regulator 208, but can be used with any regulator that is built out of thick oxide, higher voltage CMOS devices, and that has an output driving thin oxide, lower voltage CMOS circuitry.

The protection circuit 260 has no impact on current drain, and little impact on die area. Advantageously, if the power supply to the regulator 208 is toggled as a means of battery-save, the protection circuit 260 also provides protection during normal start-up conditions. A dual-oxide IC 201 having the protection circuit 260 coupled to the output of a regulator, has the reliability of a thick oxide IC without a current drain or a die area penalty of a thick oxide-only IC.

Advantageously, without using any external capacitance, the protection circuit 260 provides protection to ICs 201 that lack significant internal capacitance. Referring again to FIG. 2, use of the protection circuit 260 allows the power-out pin to be eliminated, as indicated by arrow 280, which points to an area of an absent power-out pin. Advantageously, the protection circuit 260 provides protection to an IC that, in order to save pin-out, does not have a power-out pin.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. For instance, although the exemplary embodiment is fabricated using a dual-oxide process, the invention is equally applicable to ICs manufactured using a multiple-oxide process. Although the exemplary embodiment is fabricated using a 90-nm CMOS process, the invention is equally applicable to ICs manufactured using a larger or a smaller CMOS process.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit (IC) fabricated using complementary metal oxide semiconductor (CMOS) process, comprising:

a substrate including a thick oxide portion and a thin oxide portion;

a voltage regulator, disposed on the thick oxide portion, the voltage regulator having an input for receiving electrical power from a supply and having an output for supplying an output voltage at a regulated level, the voltage regulator needing a start-up period to elapse subsequent to first receiving electrical power from the supply to be able to maintain the output voltage at the regulated level;

a load circuit, coupled to the output of the voltage regulator, disposed on the thin oxide portion; and a protection circuit, disposed on the thick oxide portion, coupled to the output of the voltage regulator and to the supply, for preventing the voltage of the output of the voltage regulator from exceeding the regulated level during the start-up period.

2. The IC of claim 1 in which the voltage regulator receives electrical power from the supply at a first voltage.

3. The IC of claim 2 in which the regulated level of the output voltage from the voltage regulator is at a second voltage, the second voltage being less than the first voltage.

4. An integrated circuit (IC), comprising:

a voltage regulator unit, the voltage regulator unit further comprising a voltage regulator circuit for outputting a voltage at a regulated level, and a protection circuit;

means for coupling a supply of electrical power to the voltage regulator unit; and a load circuit coupled to the voltage regulator unit;

wherein the voltage regulator circuit needs a start-up period to elapse subsequent to first receiving electrical power from the supply to be able to maintain the output voltage at the regulated level, and wherein the protection circuit includes means for preventing the voltage regulator unit from outputting a voltage at a level higher than the regulated level during the start-up period.

5. The IC of claim 4, in which the IC is fabricated using a dual-oxide complementary metal oxide semiconductor (CMOS) process.

6. The IC of claim 5, in which the IC comprises at least one thin oxide area and at least one thick oxide area.

7. The IC of claim 6 in which the voltage regulator and the protection circuit are located in a thick oxide area.

8. The IC of claim 6 in which the load circuit is located in a thin oxide area.

9. The IC of claim 4 in which the voltage regulator receives the electrical power from the supply at a first voltage.

10. The IC of claim 9 in which the regulated level of the output voltage from the voltage regulator is at a second voltage, the second voltage being less than the first voltage.

* * * * *